April 26, 1932. E. B. CONKLIN 1,855,878
PROCESS OF TREATING SLUDGE ACID
Filed Aug. 20, 1928
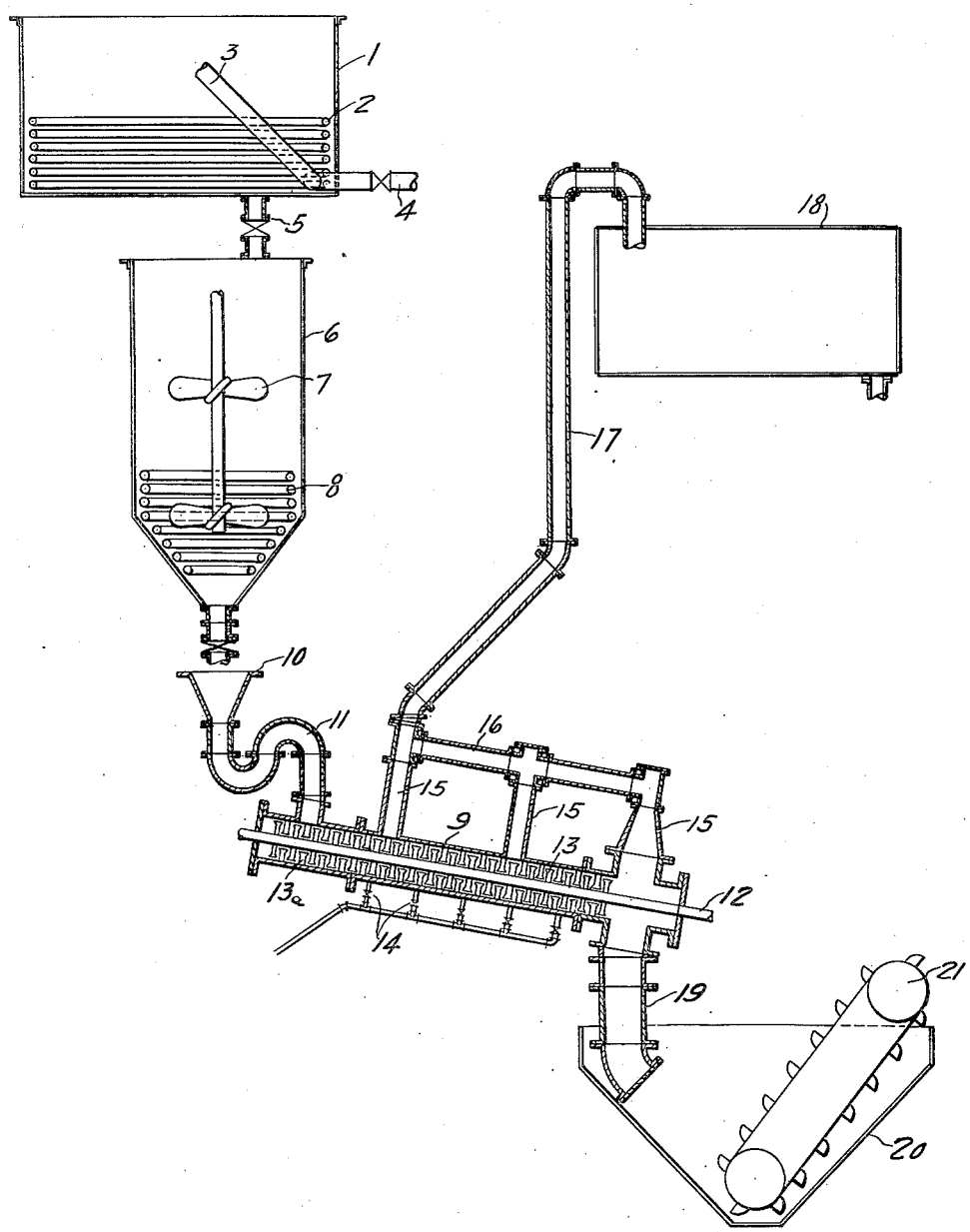
EARL B. CONKLIN
INVENTOR
BY Forbes Sileby
ATTORNEY Patented Apr. 26, 1932

1,855,878

UNITED STATES PATENT OFFICE

EARL BIDDLE CONKLIN, OF SYRACUSE, NEW YORK, ASSIGNOR TO SEMET-SOLVAY COMPANY, OF NEW YORK, N. Y., A CORPORATION OF NEW YORK

PROCESS OF TREATING SLUDGE ACID

Application filed August 20, 1928. Serial No. 300,898.

The present invention relates to the treatment of acid sludges produced in the purification of oils by treatment with acid, and particularly to a method of treating the acid sludge produced in the purification of crude coke oven light oil by treatment with sulfuric acid.

Acid sludges having characteristics which adapt them for treatment according to my invention are produced as waste products in the purification of crude coke oven light oil or similar oils by treatment with sulfuric acid. During this treatment certain undesirable constituents of the oil such as olefins are separated by mixing the sulfuric acid with the oil and then agitating the mixture until the impurities are combined with or absorbed in the acid. The mixture is then allowed to stand until a heavy acid sludge settles out which is drawn off and usually discarded as waste.

Disposal of this acid sludge as waste presents a difficult problem since running it off into sewers, or other waterways is objectionable because of its corrosive and obnoxious nature. In order to avoid this difficulty it has been proposed to work up the sludge into useful products; however, due to its extremely complex and variable composition, treatment thereof for the recovery or separation of its useful constituents involves problems of considerable technical difficulty. Of the various proposed chemical treatments of the sludge none have, to my knowledge, resulted in a satisfactory commercial method. Treatments have been attempted which involved subjecting the acid sludge to distillation but it was found that the sludge acid is not amenable to the ordinary distillation processes, because of the comparatively low yield of useful products and operating difficulties due to the sticky and viscous nature of the distillation residue.

The object of my invention is the provision of a process and apparatus for treating the acid sludge whereby it may be readily disposed of without the difficulties characterizing the methods proposed heretofore and whereby valuable commercial products are produced.

According to my invention volatile hydrocarbons or light oils present in the acid sludge are separated therefrom and the sludge converted into a solid residue which may be readily disposed of since it does not have the objectionable characteristics of the sludge, by maintaining a body of the sludge in a distillation zone under mechanical agitation and at a temperature suitable for the vaporization of its volatile hydrocarbon content, this temperature being maintained preferably by passing steam through the sludge mass. During the distillation operation the distillation residue is substantially continuously withdrawn as it is formed, and further quantities of sludge added to the sludge body undergoing distillation, whereby the sludge treatment is rendered continuous and the recovery of light oil greatly increased. This increase in the recovery of light oil is largely due to the removal from the distillation mass of the viscous or solid distillation residue which would otherwise retard the mechanical agitation of the distillation mass to such an extent as to render an effective or complete recovery of its light oil content impossible or commercially impracticable. Further features of my invention are certain treatments of the sludge preliminary to the distillation operation involving a partial separation of the light oil and acid content thereof and a reduction of its viscosity. My invention further includes the novel form and combination of apparatus shown and described for carrying out the above process. Various other features and advantages of my invention will be set forth in the following detailed description thereof in connection with the accompanying drawing which illustrates a preferred form of apparatus for carrying out the process and which apparatus form a part of my invention.

Referring to the drawing, a settling or decanting receptacle 1 is provided for the initial reception of the acid sludge and for a preliminary separation of oil and acid therefrom. This tank is preferably provided with heating means such as steam coil 2 for maintaining the sludge in a fluid or free-flowing condition suitable for the subsequent distillation operation, and which also facilitates a partial separation of the oil and acid content of the sludge in the form of supernatant layers. An adjustable overflow pipe 3 pivotally supported on the valved outlet pipe 4 is positioned within the tank for decanting off and separating the supernatant layers of oil and acid from each other and the remaining sludge.

The decanting receptacle 1 is connected by valved pipe 5 to a preliminary heating and agitating vessel 6 preferably arranged below the level of the sludge outlet of receptacle 1 so as to permit gravity flow. Suitable agitating means 7 and heating means such as steam coils 8 are associated with the receptacle for reducing the viscosity of the sludge. Receptacle 6 may be replaced if desired by other suitable means for reducing the viscosity of the sludge, as for example by means for admixing a suitable diluent such as warm water therewith, or in some instances it may be found desirable to omit the means for reducing the viscosity of the sludge and/or the preliminary separator vessel 1 and charge the acid sludge directly into the still.

The still comprises an elongated distilling chamber 9, preferably slightly inclined to the horizontal, as for example about 10°, so as to permit a gravity flow of the distillation mass therethrough. The means shown for charging the acid sludge into chamber 9 are preferably disposed at the upper end portion thereof and comprise a hopper 10 opening into a goose-neck conduit 11, the hopper being disposed above the upper curve of the conduit as shown so that the sludge is fed by gravity into chamber 9, and flow of gas through the conduit into or from the chamber is prevented. Disposed within the distillation zone or chamber 9 are suitable means for mechanically agitating the sludge stream as it flows therethrough, preferably comprising a rotatable shaft 12 centrally and longitudinally disposed in the distillation chamber and having agitator blades or breaker arms 13 affixed to the sides thereof at suitable intervals. Inwardly projecting breaker arms or blades 13ᵃ are also preferably provided on the wall of chamber 9 which blades cooperate with blades 13, in maintaining the required agitation of the sludge stream. These agitating blades assist in the transfer of the sludge through the still as well as maintaining the required agitation. If desired, they may be given a suitable pitch so as to impel the sludge in the direction of the discharge outlet.

Disposed along the bottom of the distillation zone or chamber 9 are a plurality of ducts 14 for introducing steam at a suitable pressure into the distillation mass. Although a plurality of ducts, as shown, is the preferred method of introducing the steam, other methods may be used, and if desired the means shown for heating the distillation mass to the temperature required for volatilization of its light oil content may be supplemented by indirect heating, as for instance by providing a steam jacket around chamber 9, or indirect heat might be used entirely. A number of vapor outlets 15 are provided to withdraw vapor envolved in chamber 9 into manifold 16 and from there through vapor line 17 into condenser 18.

Means for discharging the distillation residue are disposed at the end of chamber 9 opposite the charging means comprising a conduit 19 which extends downwardly from the chamber into discharge tank 20. Tank 20 is filled with water above the level of the discharge opening of conduit 18, thereby forming a liquid seal. Any suitable means such as bucket conveyor 21 may be provided for discharging the distillation residue from tank 20.

The method of using the apparatus will be apparent from the foregoing description and the following example of its application to a specific acid sludge obtained during the purification of crude coke oven light oil and having the following approximate composition:

|  | Per cent |
|---|---|
| Free light oil | 10 |
| Free sulfuric acid | 5 |
| Available light oil | 30 |
| Pitch residue | 55 |

In the above analysis "free light oil" and "free acid" designate the oil and acid which may be separated by some physical method such as decanting which may be effected in the preliminary separating vessel 1. Available light oil refers to additional light oil which may be recovered by the distillation process provided by the invention.

A sludge acid having this approximate composition may be produced by the treatment of about 2800 gallons of crude coke oven light oil with about 72 gallons of 1600 g. p. l. sulfuric acid, the volume of the resultant acid sludge being about 150 gallons. Each batch of oil is usually given two washings, the acid used in the first washing being spent acid from a previous operation. The approximate composition of the acid sludge produced during this first washing is indicated above.

The acid sludge is first introduced into decanting receptacle 1 where it is heated by means of steam coils 2 and permitted to settle until its "free" oil and "free" acid content separate in the form of supernatant layers. These layers of acid and oil are then separated from each other and the residual sludge by means of the adjustable overflow pipe 3, and are withdrawn through pipe 4. The residual sludge is then permitted to flow through pipe 5 into receptacle 6 where it is heated by steam coil 8 and agitated by agitator 7 until its viscosity is reduced to such a degree as to insure its flow at a suitable rate through the still due to the force of gravity and the action of the agitator within the still.

The sludge is preferably fed into hopper 10 so as to maintain the latter at least partially filled at all times, thereby providing a continuous charging of the still.

In initiating the distillation operation the chamber 9 is partially filled with sludge, and then the agitator 17 is actuated by any suitable means and steam introduced into the mass or body of sludge through the ducts 14. The sludge is gradually transferred through the chamber by the action of gravity and the agitator and during this movement its volatile hydrocarbon or available light oil content is progressively vaporized by the steam preferably at high pressure which comes into intimate contact with all parts of the distillation mass due to the thorough mechanical agitation. As the sludge stream moves in the direction of the discharge conduit 19, it successively passes from its fluid or semifluid stage into a viscous or tacky stage and finally becomes hard and brittle which latter characteristic indicates that the removal of the volatile hydrocarbons is substantially complete. This solid distillation residue is continuously discharged through conduit 19 beneath the surface of the liquid in tank 20, and from there discharged to waste by way of bucket conveyor 21.

The vapors evolved are withdrawn through vapor outlets 15 and through vapor line 17 into condenser 18. The light oil content of the condensate may be separated from impurities such as water present therein in any suitable manner. In some instances it is also desirable to treat the recovered light oil with caustic to neutralize any acidic impurities contained therein.

Control of the distillation operation by regulating the rate of steam and sludge feed and agitation so as to secure an effective recovery of light oil is secured by tests or examinations of the distillation residue and distillate.

By suitably controlling the condition of operation as above indicated a substantially complete recovery of the light oil content of the acid sludge may be obtained. The oil thus recovered may be utilized as a motor fuel or for many other purposes.

What is claimed is:

1. A continuous process of treating acid sludge obtained in the purification of coke oven light oil and similar oils by treatment with sulfuric acid, which comprises maintaining a body of such sludge in a distillation zone under mechanical agitation while passing steam therethrough to vaporize its volatile hydrocarbon content, withdrawing distillation residue from the body of sludge undergoing distillation during the distillation operation and adding further quantities of sludge thereto and collecting and condensing the evolved vapors.

2. A process of treating acid sludge obtained in the purification of coke oven light oil and similar oils with sulfuric acid, which comprises continuously feeding a stream of said sludge through a distillation zone, continuously mechanically agitating the sludge in said zone while passing steam therethrough to vaporize its volatile hydrocarbon content, condensing and recovering light oil from the vapors thus formed, and continuously discharging the distillation residue from said distillation zone.

3. A process of treating acid sludge obtained in the purification of coke oven light oil and similar oils with sulfuric acid, which comprises continuously feeding a stream of said sludge through a distillation zone by gravity, continuously mechanically agitating the sludge in said zone while passing steam therethrough to vaporize its volatile hydrocarbon content, condensing and recovering light oil from the vapors thus formed, and continuously discharging the distillation residue from said distillation zone.

4. A process of treating acid sludge obtained in the purification of coke oven light oils and similar oils with sulfuric acid, which comprises reducing the viscosity of said sludge so as to produce a free-flowing mixture, continuously feeding a stream of said sludge through a distillation zone, continuously mechanically agitating the sludge in said zone while passing steam therethrough to vaporize its volatile hydrocarbon content, condensing and recovering light oil from the vapors thus formed and continuously discharging the distillation residue from said distillation zone.

5. A process of treating acid sludge obtained in the purification of coke oven light oils and similar oils with sulfuric acid, which comprises permitting the sludge to settle until supernatant layers of acid and oil are formed thereon, separating the layers of oil and acid from the sludge and each other by decanting, heating and agitating the remaining sludge to reduce its viscosity, continuously feeding a stream of said sludge through a distillation zone, continuously mechanically agitating the sludge in said zone while passing steam therethrough to vaporize its volatile hydrocarbon content, condensing and recovering light oil from the vapors thus formed, and continuously discharging the distillation residue from said distillation zone.

6. An apparatus for treating acid sludges obtained in the refining of crude coke oven light oil and similar oils by treatment with sulfuric acid, which comprises a decanter for effecting a preliminary gravity separation of oil and acid from said sludge, an elongated distilling chamber having its longitudinal axis slightly inclined with respect to the horizontal, means in the upper portion of said chamber for charging acid sludge thereto, means for introducing steam into said sludge charge, means within said chamber for mechanically agitating the sludge, means for permitting the escape of volatile hydrocarbons from the chamber comprising a series of spaced outlets, and a condenser for collecting and condensing the volatile hydrocarbons withdrawn from said chamber.

7. An apparatus for treating acid sludges obtained in the refining of crude coke oven light oil and similar oils by treatment with sulfuric acid, which comprises a decanter for effecting a preliminary gravity separation of oil and acid from said sludge, a receptacle having agitating and heating means for reducing the viscosity of the sludge, an elongated distilling chamber having its longitudinal axis slightly inclined with respect to the horizontal, means in the upper portion of said chamber for charging acid sludge thereto, means for introducing steam into said sludge charge, means within said chamber for mechanically agitating the sludge, a condenser for collecting and condensing the volatile hydrocarbons evolved from the sludge charge, and means in the lower portion of said chamber for withdrawing distillation residue therefrom.

In witness whereof I hereto set my hand.

EARL BIDDLE CONKLIN.